United States Patent [19]
Sato et al.

[11] Patent Number: 6,128,141
[45] Date of Patent: Oct. 3, 2000

[54] LENS BARREL AND OPTICAL APPARATUS HAVING THE SAME

[75] Inventors: Tatsuya Sato; Ryuji Suzuki; Masahisa Tamura, all of Yokohama; Jun Sugita, Sagamihara, all of Japan

[73] Assignee: Canon Kabushiki Kaisha, Tokyo, Japan

[21] Appl. No.: 09/237,597

[22] Filed: Jan. 25, 1999

[30] Foreign Application Priority Data

Jan. 29, 1998 [JP] Japan .................................. 10-017129

[51] Int. Cl.⁷ .................................................. G02B 15/14
[52] U.S. Cl. ........................... 359/696; 359/698; 359/699
[58] Field of Search .................................. 359/696, 697, 359/698, 699, 700, 701, 823, 827

[56] References Cited

U.S. PATENT DOCUMENTS 5,387,835  2/1995  Tasukimoto et al. .................... 310/323
5,742,850  4/1998  Nomura et al. ........................... 396/72

*Primary Examiner*—Georgia Epps
*Assistant Examiner*—Saeed Seyrafi
*Attorney, Agent, or Firm*—Robin, Blecker & Daley

[57] ABSTRACT

A lens barrel includes a moving tube arranged to move in an optical axis direction, the moving tube having at least three cams arranged along a circumferential direction thereof, in which an interval between one pair of cams in the circumferential direction is larger than an interval between another pair of cams in the circumferential direction, a cutout being formed in the moving tube at a part between the one pair of cams having the larger interval, and a driving device disposed on the side of the cutout of the moving tube and including a motor having a rotation shaft parallel with the optical axis direction and a gear mechanism having an output gear arranged to rotate according to a rotation of the rotation shaft, the motor and the output gear being juxtaposed, and end parts of the motor and the output gear on the side of the moving tube being inserted within the cutout of the moving tube at least when the moving tube comes closest to the motor and the output gear.

26 Claims, 7 Drawing Sheets

F I G. 7
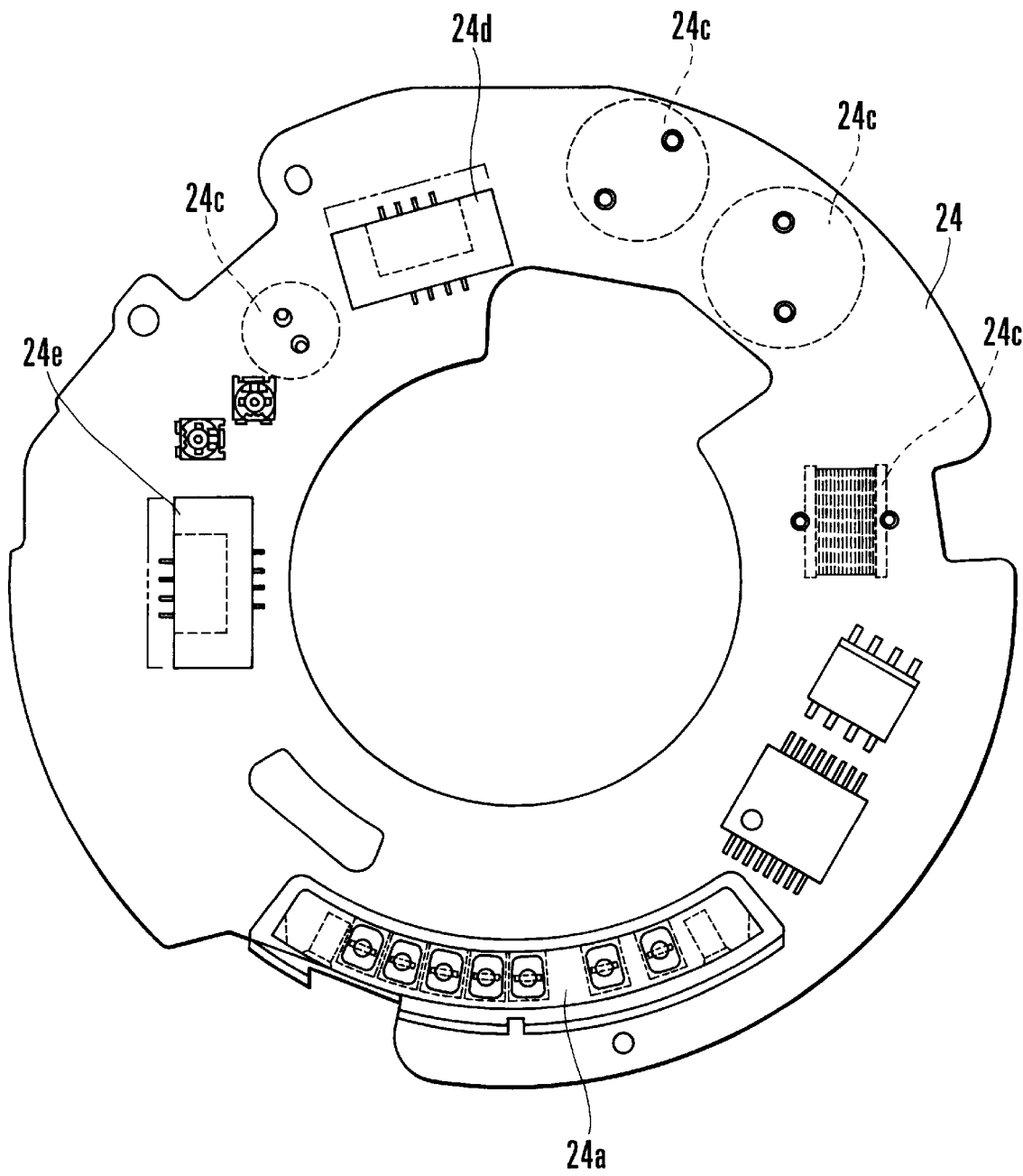

LENS BARREL AND OPTICAL APPARATUS HAVING THE SAME

BACKGROUND OF THE INVENTION

1. Field of the Invention

The present invention relates to a lens barrel in which a motor and a gear arranged to transmit the output of the motor to a part to be driven such as a rotating tube of the lens barrel are incorporated, and an optical apparatus having such a lens.

2. Description of Related Art

Many of lens-interchangeable type cameras or compact cameras such as lens-shutter type cameras are arranged these days to have an automatic focusing function. In the case of lens-interchangeable single-lens reflex cameras, two methods for automatic focusing have been known. In one method, an automatic focusing motor is disposed inside a camera body and the output of the motor is transmitted through a coupler of a mount part to a distance ring of the lens barrel. In the other method, a motor unit composed of an automatic focusing motor and a reduction gear, etc., is disposed within a lens barrel and electric power is supplied from a camera body through a mount part to the motor unit.

The method of having an automatic focusing motor or a motor unit disposed within an interchangeable lens barrel has such an advantage that the speed of driving a moving lens for automatic focusing is not affected by the load (weight) of the moving lens. However, this method is detrimental to a reduction in size of the lens barrel.

In the case of a zoom lens, each lens group is arranged to be moved by transmitting rotation or a rectilinear motion of a zoom operation ring, through a roller which fittingly engages a cam groove or a rectilinear motion groove or through a cam follower which abuts on a cam face, to a movable lens-group holding frame.

In a known structural arrangement, the cam groove and the rectilinear motion groove and a roller fittingly engaging these two grooves for moving the movable lens-group holding frame in the direction of the optical axis or the cam face and the cam follower abutting on the cam face are formed at two symmetric positions which are spaced 180 degrees. According to this arrangement, however, the movable lens-group holding frame tends to be caused to slant by a fitting play between the roller and the cam groove or the rectilinear motion groove or by an abutment play between the cam follower and the cam face. The optical performance of the interchangeable lens barrel, therefore, tends to be affected by the play. To minimize the adverse effect of the play, it has been widely practiced to have these parts arranged at three equally spaced positions at intervals of 120 degrees, instead of two positions.

Further, the above-stated cam arrangement requires the cam part to be finished at a high rate of precision. To meet this requirement, many processes are necessary for metal machining. In view of that, these parts are more often formed by molding than by metal machining as the former requires simpler processes than the latter.

FIG. 1 is a vertical sectional view showing a conventional lens barrel. FIG. 2 is a development view of the essential parts of the same lens barrel. Referring to FIGS. 1 and 2, a fixed tube 51 is formed in one body with a lens mount which is provided for mounting the lens barrel on a camera body. A zoom operation ring 52 is fitted on the fore end outer side of the fixed tube 51 and is arranged to be rotatable at a fixed position by means of a shaft screw 53. A zoom rubber piece 54 is applied to the outer side of the zoom operation ring 52.

A first cam tube 55 is connected to the zoom operation ring 52 with a screw 65 to have its motion restricted in the direction of optical axis but is arranged to be rotatable with respect to the fixed tube 51. Several lead cams 55a and 55b which are in a convex, linear shape or a non-linear shape are formed on the inner side of the first cam tube 55.

A first lens frame member 56 has cam followers 56a and 56b which are of a concave shape and are fitted on the lead cams 55a and 55b and cutouts 56c and 56d which are of an approximate U shape and arranged on the outer side of the first lens frame member 56. Rectilinear motion guide members 57 are secured to the fixed tube 51 at one end of them and fitted in the cutouts 56c and 56d in the direction of the width of the lens barrel.

A second cam tube 58 has protruding cams 58b of an approximately helical shape arranged on its inner side to engage the cam followers 55c and 55d which are provided on the outer side of the first cam tube 55. A projection 58a is formed on the rear end outer face of the second cam tube 58 and engages the rectilinear motion guide groove 51a provided in the fixed tube 51.

A second lens frame member 59 has a helicoid 59a arranged on its inner side to be helicoid-coupled with a helicoid 58c formed on the fore end outer side of the second cam tube 58. Reference numeral 60 denotes a third lens frame member. Reference numeral 61 denotes a motor-driven diaphragm device.

An automatic focusing motor unit 62 has an automatic focusing motor (DC motor) 62a mounted thereon and is provided with a focus gear 62b. The focus gear 62b is in mesh with a gear (not shown) which is disposed within the second lens frame member 59. When the motor 62a is caused to rotate, a lens group which is carried by the second lens frame member 59 moves in the direction of the optical axis together with the second lens frame member 59 to perform a focusing action.

FIG. 3 is a plan view showing the automatic focusing motor unit 62 as viewed from on the side of the fixed tube 51. As shown, the motor unit 62 is composed of a plurality of reduction gears 62d and an idler gear 62c. These gears are arranged within a phase range of about 180 degrees.

In FIGS. 1 and 2, reference numeral 63 denotes a circuit board arranged to drive the automatic focusing motor 62a and the motor-driven diaphragm device 61. A lens microcomputer 63c is arranged on the circuit board 63 to receive electric power and information about a stopped-down amount of the diaphragm, a driving amount for focusing, etc., from a camera microcomputer which is disposed on the side of the camera body through a contact block 63a.

With the lens barrel arranged in this manner, when the zoom operation ring 52 is rotated, the first cam tube 55 rotates in the same direction and to the same extent as the rotation of the zoom operation ring 52. When the first cam tube 55 rotates, the first lens frame member 56 is moved along the rectilinear guide members 57 in the direction of the optical axis through the cam followers 56a and 56b which are in fitting engagement with the lead cams 55a and 55b formed on the inner side of the first cam tube 55. The fitting engagement of the cam followers 55c and 55d of the first cam tube 55 with the approximately helical protruding cam 58b causes the second cam tube 58 to move straight along the rectilinear guide groove 51a provided in the fixed tube 51. Then, the second lens frame member 59 which is helicoid-coupled with the second cam tube 58 moves in the direction of the optical axis. A zooming action is thus performed accordingly as the first lens frame member 56 and the second lens frame member 59 move back and forth in the direction of the optical axis.

Further, the focus gear 62b which is thrust-restricted by the second cam tube 58 is arranged to move forward or backward in the same manner as the second cam tube 58. The focus gear 62b is thus arranged to be capable of transmitting the rotation of the motor 62a to the second lens frame member 59 in any region of zooming.

In the lens barrel shown in FIGS. 1 and 2, the automatic focusing motor unit 62 occupies a large phase range of 180 degrees. Therefore, the large (high) protruding elements 63c forming the circuit board 63 must be arranged within a limited space where they do not interfere with the automatic focusing motor unit 62. The limitation of the space restricts the design latitude for the circuit board 63 to necessitate it to be arranged in a multilayer shape, which has resulted in a cost increase.

Further, to avoid interference of the second cam tube 58 shown in FIG. 1 with the motor 62a or with the reduction gear 62d in a zooming region obtained when the second cam tube 58 is caused by zooming to come to a position 58f which is nearest to the fixed tube 51, it is necessary to provide two cutouts 58d and 58e in the second cam tube 58. However, the provision of the two cutouts 58d and 58e degrades the strength of the second cam tube 58.

BRIEF SUMMARY OF THE INVENTION

It is a general object of the invention to provide a lens barrel and an optical apparatus arranged to be capable of solving at least one of the problems of the prior arts described in the foregoing.

To attain the above object, in accordance with an aspect of the invention, there is provided a lens barrel, which comprises a moving tube arranged to move in an optical axis direction, the moving tube having at least three cams arranged along a circumferential direction thereof, in which an interval between one pair of cams in the circumferential direction is larger than an interval between another pair of cams in the circumferential direction, a cutout being formed in the moving tube at a part between the one pair of cams having the larger interval, and a driving device disposed on the side of the cutout of the moving tube and including a motor having a rotation shaft parallel with the optical axis direction and a gear mechanism having an output gear arranged to rotate according to a rotation of the rotation shaft, the motor and the output gear being juxtaposed, and end parts of the motor and the output gear on the side of the moving tube being inserted within the cutout of the moving tube at least when the moving tube comes closest to the motor and the output gear.

In accordance with another aspect of the invention, there is provided a lens barrel, which comprises a moving tube arranged to move in an optical axis direction and having a cutout, and a driving device disposed on the side of the cutout of the moving tube and including a motor having a rotation shaft parallel with the optical axis direction and a gear mechanism having an output gear arranged to rotate according to a rotation of the rotor, the motor and the output gear being juxtaposed, and end parts of the motor and the output gear on the side of the moving tube being inserted within the cutout of the moving tube at least when the moving tube comes closest to the motor and the output gear.

In accordance with a further aspect of the invention, there is provided a lens barrel, which comprises a moving tube arranged to move in an optical axis direction, the moving tube having at least three cams arranged along a circumferential direction thereof, in which an interval between one pair of cams in the circumferential direction is larger than an interval between another pair of cams in the circumferential direction, a cutout being formed in the moving tube at a part between the one pair of cams having the larger interval, and a driving device disposed on the side of the cutout of the moving tube and including a bar-shaped vibration motor having a rotor arranged to rotate around a rotation axis parallel with the optical axis direction and a gear mechanism having an output gear arranged to rotate according to a rotation of the rotor, the motor and the output gear being juxtaposed, and end parts of the motor and the output gear on the side of the moving tube being inserted within the cutout of the moving tube at least when the moving tube comes closest to the motor and the output gear.

In accordance with a still further aspect of the invention, there is provided a lens barrel, which comprises a driving device including a bar-shaped vibration motor having a rotor arranged to rotate around a rotation axis and a gear mechanism having an output gear arranged to rotate according to a rotation of the rotor, the motor and the output gear being juxtaposed, and a circuit board on which a plurality of electric parts are mounted, the circuit board and the vibration motor being electrically connected to each other.

In accordance with a still further aspect of the invention, there is provided a driving device, which comprises a bar-shaped vibration motor having a rotor arranged to rotate around a rotation axis, a gear mechanism having an output gear arranged to rotate according to a rotation of the rotor, the motor and the output gear being juxtaposed, and a circuit board on which a plurality of electric parts are mounted, the circuit board and the vibration motor being electrically connected to each other.

In each of the above aspects of the invention mentioned above, the gear mechanism includes a reduction gear arranged to transmit the rotation of the shaft or rotor of the motor by reducing the speed of the rotation of the output gear, and a lens holding tube which holds a focusing lens is helicoid-coupled with the moving tube. The lens holding tube has a gear formed in the circumferential direction. A focus gear is mounted on the lens holding tube to be in mesh with the gear of the lens holding tube and to cause the gear to rotate. The focus gear is arranged to move in the optical axis direction with respect to the output gear of the motor and to rotate integrally with the output gear. The cams of the moving tube are arranged to cause other lens holding frames to move in the optical axis direction. Further, a circuit board on which a plurality of electric parts are mounted is disposed near to the motor and the output gear which are juxtaposed. The circuit board and the motor are electrically connected to each other, for example, through a flexible printed circuit board.

In accordance with a still further aspect of the invention, there is provided an optical apparatus, which comprises one of the above-mentioned lens barrels and a camera body on which the lens barrel is mounted.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 7 is a plan view showing a circuit board on which the automatic focusing motor unit shown in FIG. 4 is mounted.

DETAILED DESCRIPTION OF THE INVENTION

Hereinafter, preferred embodiment of the invention will be described in detail with reference to the drawings.

Figure 4:
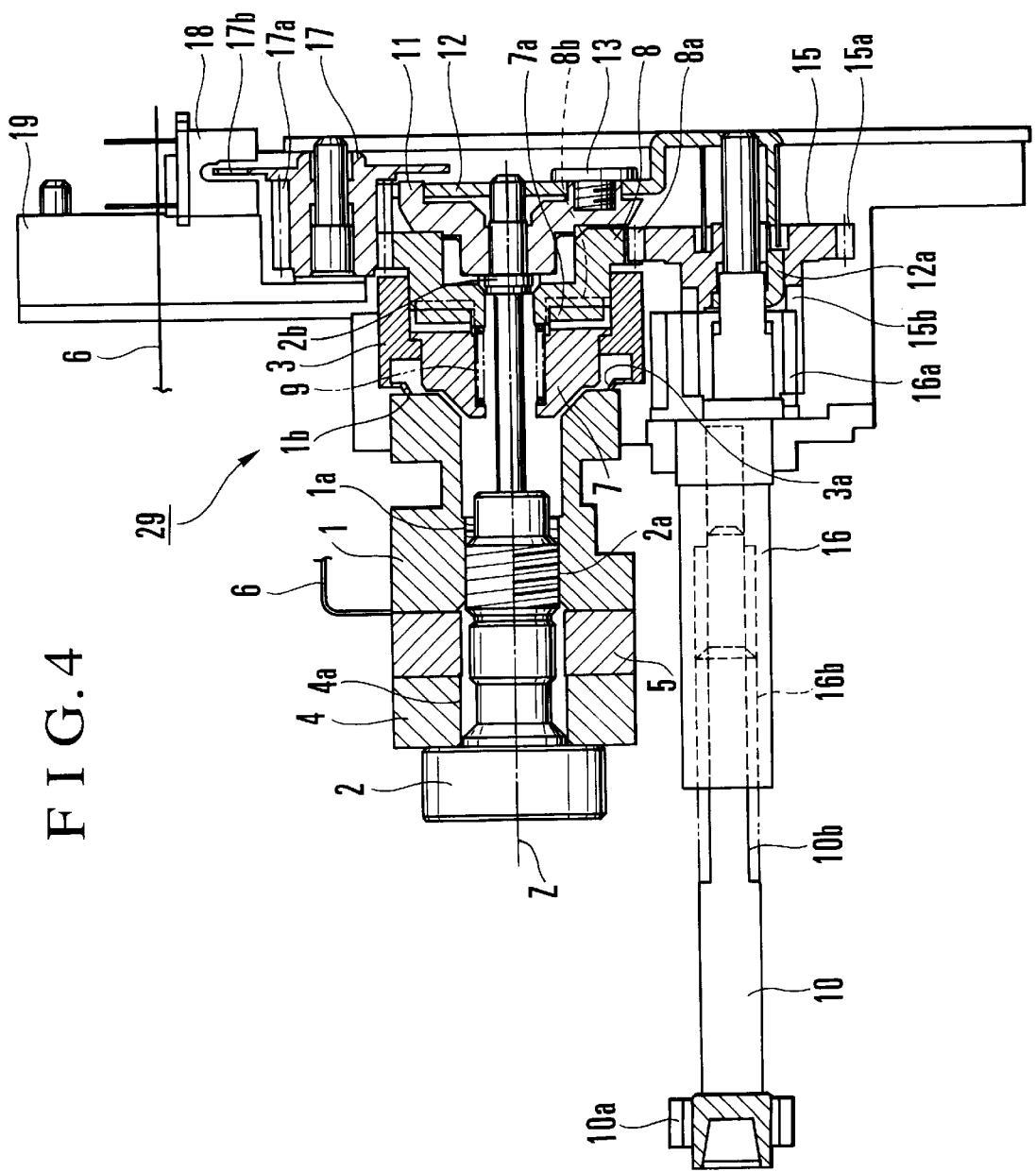
FIG. 4 is a partly-developed sectional view of an automatic focusing motor unit of a lens barrel according to an embodiment of the invention.
Figure 5:
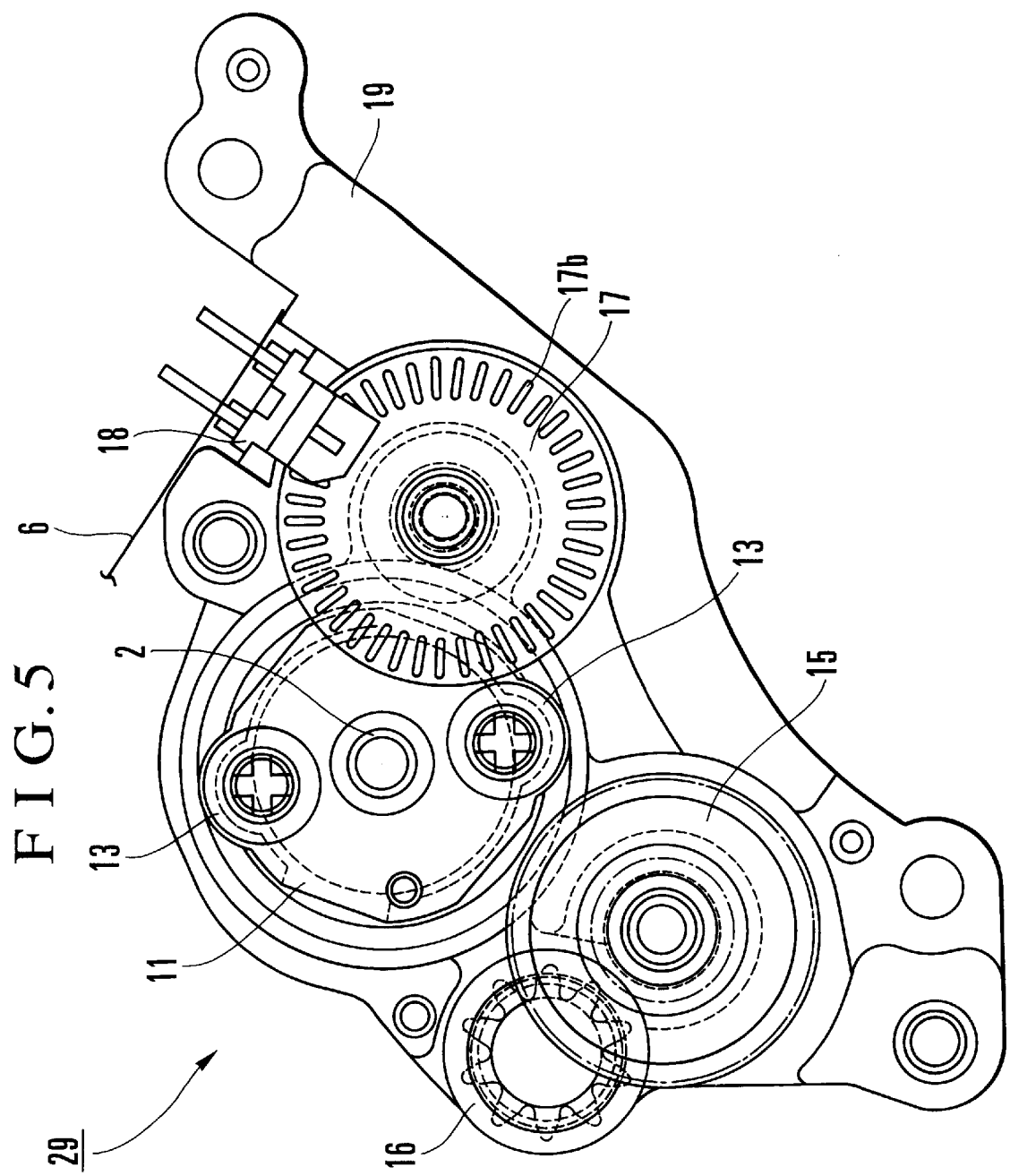
FIG. 5 is a plan view of the automatic focusing motor unit shown in FIG. 4.

FIG. 4 is a partly-developed sectional view of an automatic focusing motor unit 29 of an interchangeable lens barrel according to an embodiment of the invention. FIG. 5 shows in a plan view the automatic focusing motor unit 29. The basic arrangement of the whole lens barrel according to the embodiment of the invention is the same as the conventional lens barrel described in the foregoing with reference to FIG. 1. The lens barrel according to the embodiment of the invention is to be used by mounting the lens barrel on a camera body or the like.

A bar-shaped vibration motor is employed as a drive source for the automatic focusing motor unit 29. Therefore, the arrangement of the bar-shaped vibration motor is first described as follows.

Referring to FIGS. 4 and 5, the bar-shaped vibration motor includes a vibrating elastic body 1 which is used as an oscillator (stator). The vibrating elastic body 1 is in a tubular shape having an indented intermediate part. A hole in the middle part of the vibrating elastic body 1 is provided with a female thread 1a which is arranged to engage a screw part 2a of a conductive shaft 2. Further, the vibrating elastic body 1 is made of a conductive material and has its one end face 1b in pressed-contact with one end face 3a of a rotor 3. The rotor 3 is in a tubular shape and is mounted by fitting the rotor 3 on the outer side of a spring holding member 7 which is also in a tubular shape.

A retaining body 4 is provided with a center hole 4a and is pressed against a piezoelectric element 5 by the head part of the conductive shaft 2. The piezoelectric element 5 is an electric-to-mechanical energy converting element formed, for example, with a PZT material in an annular disk-like shape by laminating several sheets of the PZT having a phase A and a phase B. A flexible printed circuit board 6 is provided for supplying an AC voltage to the piezoelectric element 5.

The vibrating elastic body 1 and the retaining body 4 are vibrated when the piezoelectric element 5 oscillates in response to the AC voltage supplied from the flexible printed circuit board 6. Then, the rotor 3 is caused to rotate on an axis Z by friction between the vibrating elastic body 1 and the rotor 3.

The spring holding member 7 is secured to the rotor 3 and is arranged to receive a pressure spring 9. A rotation output member 8 which has a gear part 8a and a projection 8b is arranged to rotate together with the spring holding member 7 while the projection 8b acts to liberate the rotation output member 8 in the direction of thrust. The spring holding member 7 has a groove part 7a formed therein to have the projection 8b fitted therein.

The pressure spring 9 is arranged between the rotation output member 8 and the spring holding member 7 to press the rotor 3 into contact with the vibrating elastic body 1. A support member 11 which is arranged to secure the bar-shaped vibration motor to a mount member 12 is secured to the mount member 12 by means of screws 13. In assembling the bar-shaped vibration motor, the support member 11 is fitted on the shaft 2 to cause the support member 11 to abut on a flange part 2b of the shaft 2 and to be tightened with a nut (not shown). After that, the support member 11 is secured to the shaft 2 with an adhesive. By this arrangement, the bar-shaped vibration motor is assembled in a state of having the vibrating elastic body 1 and the rotor 3 kept pressed by the pressure spring 9.

Next, the arrangement of parts other than the bar-shaped vibration motor within the motor unit 29 is described as follows.

A reduction gear 15 is composed of a large gear part 15a and a small gear part 15b. The large gear part 15a is in mesh with the gear part 8a of the rotation output member 8 of the bar-shaped vibration motor.

An output gear 16 is composed of a transmission gear part 16a and a two-way output part 16b. The transmission gear part 16a is in mesh with the small gear part 15b of the reduction gear 15. The two-way output part 16b is in fitting engagement with the two-way part 10b of a focus gear 10. The output gear 10a of the focus gear 10 is connected to the gear part of a driven part, i.e., a focusing lens frame corresponding to the second lens frame part 59 of the lens barrel shown in FIG. 1.

A pulse gear 17 is composed of a pulse generating part 17b which is provided with a plurality of slits and a gear part 17a which is in mesh with the gear part 8a of the rotation output member 8 of the bar-shaped vibration motor. The pulse generating part 17b and the gear part 17a are formed in one body. An optical sensor, i.e., a photo-interrupter 18, is arranged to read the pulses of the pulse generating part 17b of the pulse gear 17 and to send a signal to a motor control circuit which is disposed on the circuit board 24. The photo-interrupter 18 is soldered to a flexible printed circuit board 6 of the bar-shaped vibration motor.

A fixed member 19 is arranged to rotatably carry the reduction gear 15, the output gear 16 and the pulse gear 17 and to fixedly carry the photo-interrupter 18. The fixed member 19 is secured to the fixed tube of the lens barrel with a screw. Further, the fixed member 19 is mounted on the mount member 12 with a screw to prevent the reduction gear 15 and the pulse gear 17 from coming off their positions in the direction of thrust. The movement of output gear 16 in the direction of thrust is restricted by a bent-up part 12a of the mount member 12.

FIG. 7 schematically shows a circuit board 24 on which the motor control circuit, etc., are formed. A connector 24d to which the flexible printed circuit board 6 is connected, a contact block 24a, etc., are soldered to the circuit board 24.

With the automatic focusing motor unit 29 arranged as described above, when an actuating signal (an AC voltage) is supplied from the circuit board 24 to the bar-shaped vibration motor through the flexible printed circuit board 6, the actuating signal causes the piezoelectric element 5 to vibrate. The vibration of the piezoelectric element 5 in turn causes the vibrating elastic body 1 and the retaining body 4 to vibrate. The vibrations of these parts cause the rotor 3 and the rotation output member 8 to rotate on the axis Z. The rotation is transmitted through the reduction gear 15 to the output gear 16 and the focus gear 10. With the rotation transmitted to the driven part arranged inside the lens barrel, the lens is driven in the direction of the optical axis to perform a focusing action.

Meanwhile, the rotation of the rotation output member 8 causes the pulse gear 17 which is in mesh with the gear part 8a of the rotation output member 8 to rotate. With the pulse gear 17 rotated, the number of slits of the pulse generating part 17b of the pulse gear 17 passing the photo-interrupter 18 is read by the photo-interrupter 18. Then, a reading signal is sent from the photo-interrupter 18 to the circuit board 24 through the flexible printed circuit board 6. The amount of motion of the lens in the direction of the optical axis is then controlled according to the reading signal.

Figure 6:
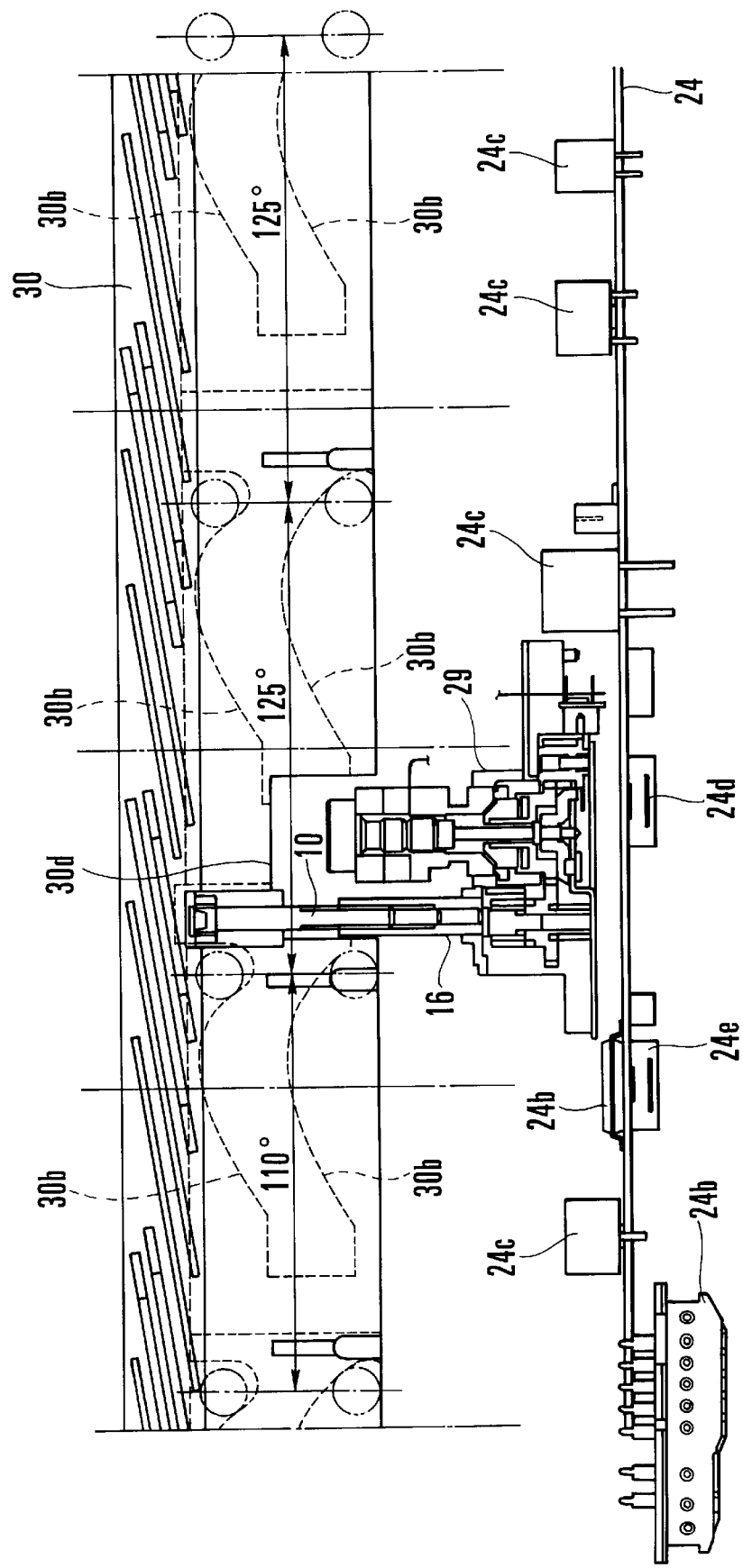
FIG. 6 is a development view showing essential parts of the same lens barrel shown in FIG. 4

FIG. 6 is a development view of essential parts of the lens barrel according to the embodiment. As mentioned above, the lens barrel is arranged basically in the same manner as the conventional lens barrel shown in FIG. 1. However, the lens barrel according to the embodiment differs from the conventional lens barrel of FIG. 1, in arrangement of the second cam tube 30 shown in FIG. 6.

Figure 1:
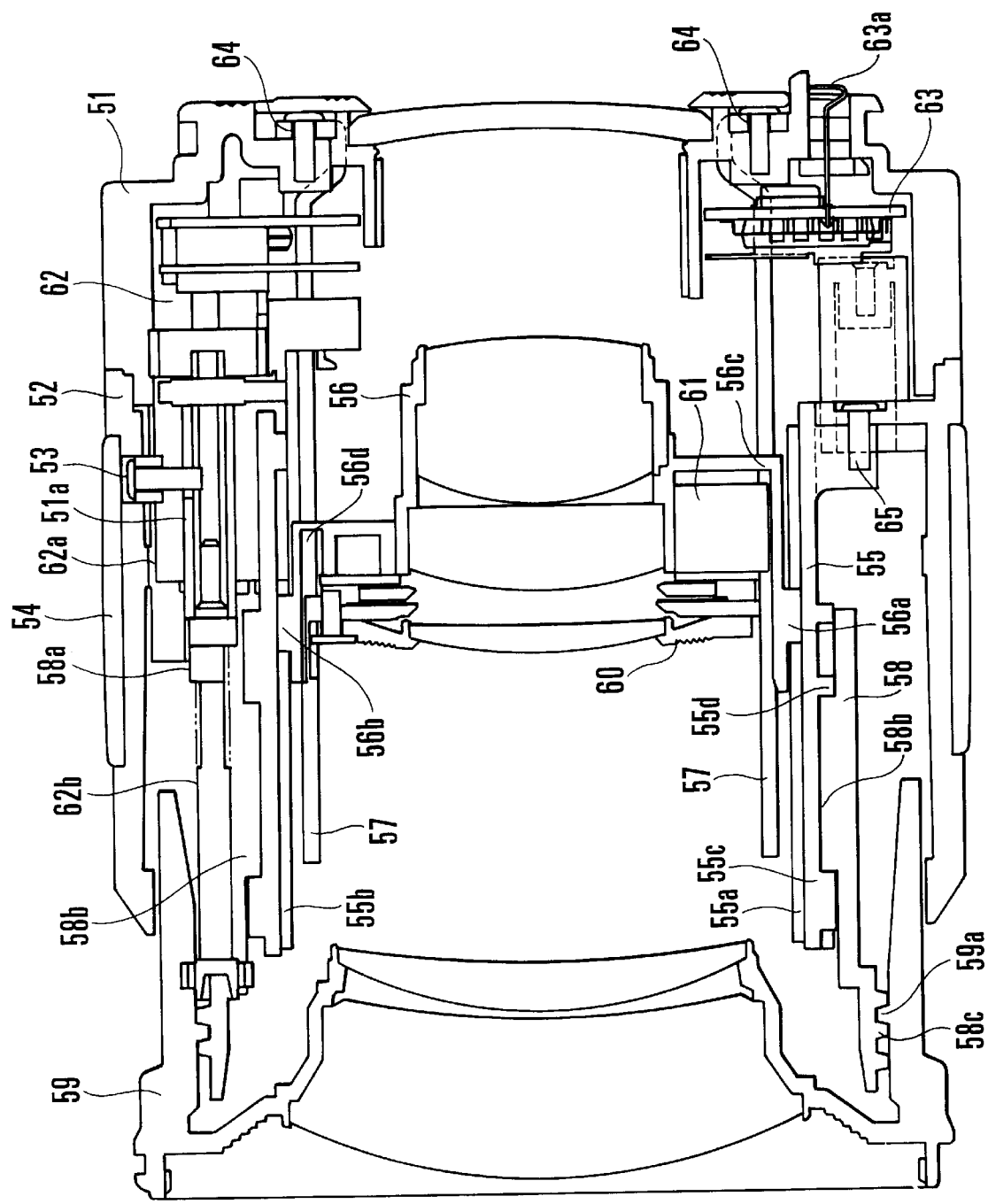
FIG. 1 is a sectional view showing the arrangement of a conventional lens barrel.

Further, in the case of the embodiment, the motor unit 29 is arranged to have the bar-shaped vibration motor, the output gear 16 and the focus gear 10 extend in the direction of the optical axis of the lens barrel and mounted inside the lens barrel in a state of being adjacently disposed in the circumferential direction of the lens barrel. Unlike the conventional motor unit shown in FIG. 1, the arrangement enables the motor unit 29 in the embodiment to be disposed within a narrower phase range as shown in FIG. 6. Protruding cams 30b having an approximately helical shape are formed and arranged on the inner side of the second cam tube 30 at intervals of uneven spacing angles of 110 degrees, 125 degrees and 125 degrees to engage cam followers 55c and 55d which are formed, as shown in FIG. 1, on the outer side of a first cam tube 55 although they are not shown in FIG. 6. At the part of the second cam tube 30 having the protruding cam spacing angles of 125 degree, there is provided only one cutout part 30d for the purpose of preventing the back and forth motions of the second cam tube 30 in the direction of the optical axis from being interfered by the vibration motor and the focus gear 10.

Figure 2:
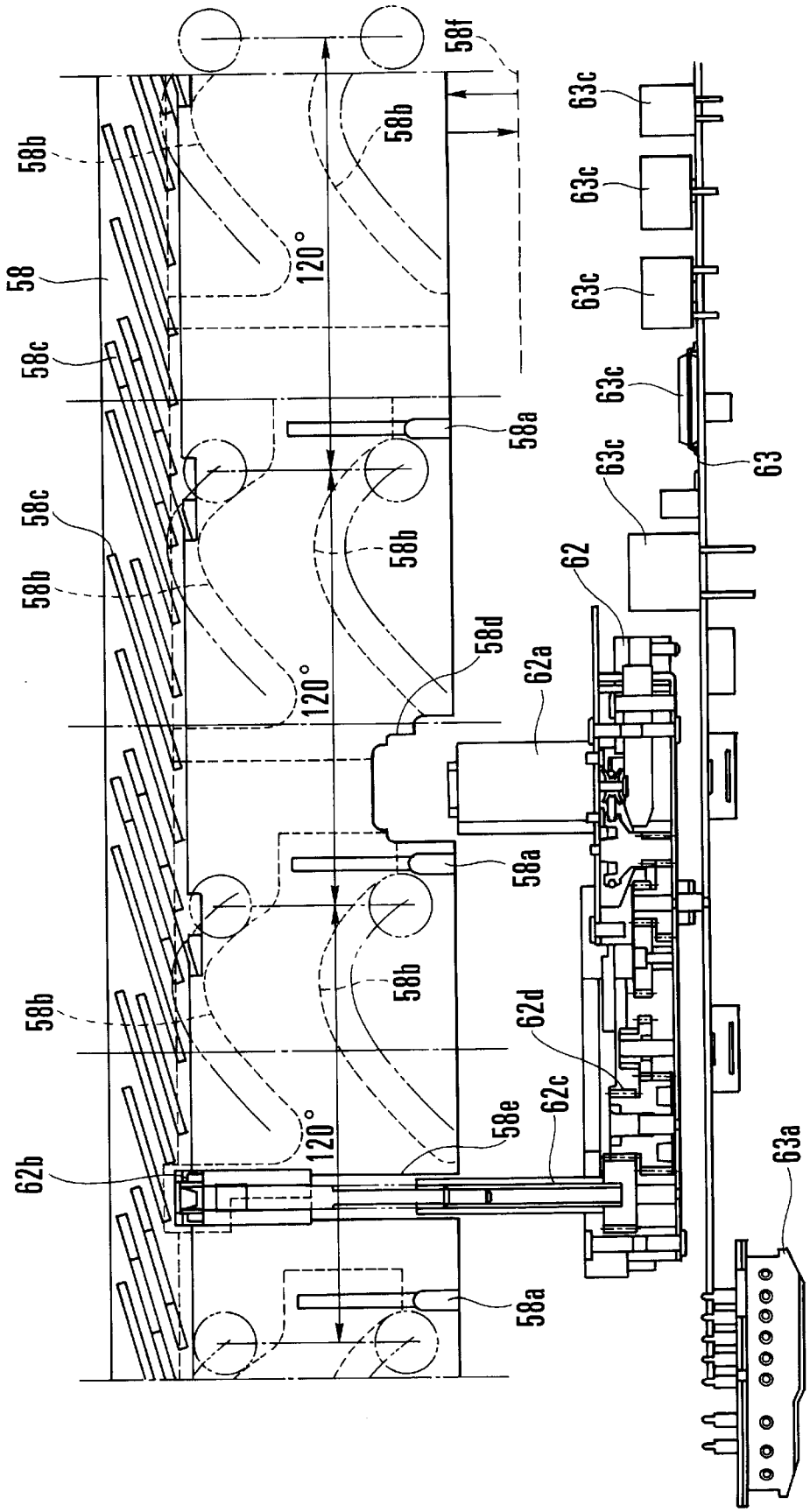
FIG. 2 is a development view showing essential parts of the conventional lens barrel.
Figure 3:
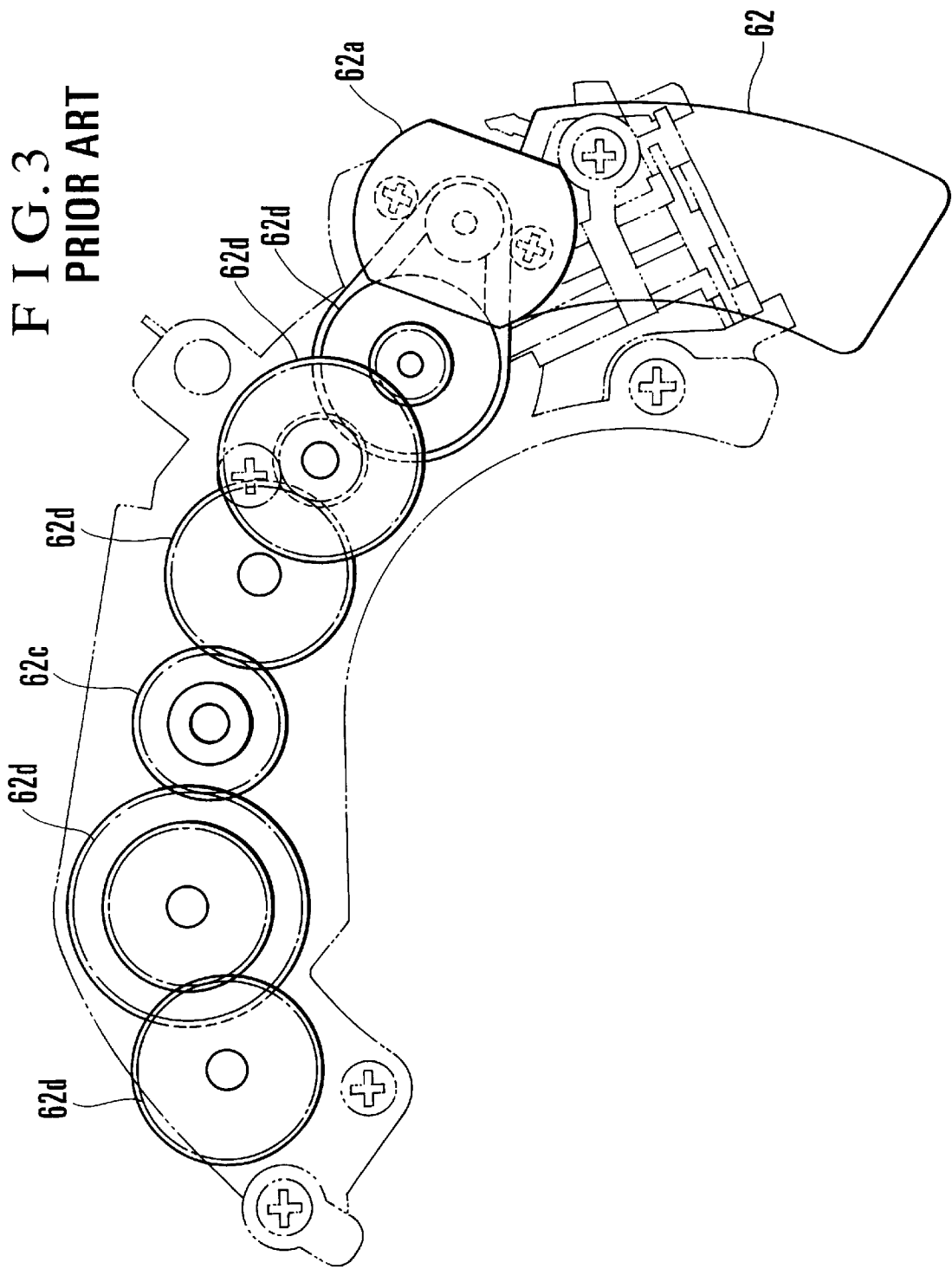
FIG. 3 is a plan view showing an automatic focusing motor unit of the conventional lens barrel.

Since the second cam tube 30 is provided with only one cutout part 30d for preventing interference, the embodiment permits the second cam tube 30 to have a greater strength than in the case of arrangement of the prior art which has two cutout parts 58d and 58e for prevention of interference as shown in FIG. 2.

In the case of the embodiment, the vibration motor is used as a drive source for the motor unit. However, a motor of some other kind, such as a DC motor or the like, may be employed in accordance with the invention. The invention is applicable not only to the lens barrel arranged as described above but also to a lens barrel of some other structural arrangement.

According to the arrangement of the embodiment disclosed, the reduction gear and the output gear for transmission of the output of the motor are adjacently arranged in the direction of the circumference of the lens barrel, and only one cutout part is formed for preventing the motor and the transmission gears from interfering with the back and forth motions of the tube. The motor unit composed of the motor and the transmission gears, therefore, can be arranged within a narrower phase range than the conventional arrangements. The arrangement according to the invention, therefore, gives a greater latitude to the design of the circuit board. Besides, the arrangement for forming only one cutout part for preventing interference with the back-and-forth moving tube permits an increase in strength of the tube.

Further, compared with the use of a DC motor, the arrangement for using the vibration motor which gives a high torque output permits reduction in number of reduction gears. The arrangement thus permits the motor unit, the lens barrel and, hence, an optical apparatus such as a camera using the lens barrel to be compactly arranged.

What is claimed is:

1. A lens barrel comprising:

a moving tube arranged to move in an optical axis direction, said moving tube having at least three cams arranged along a circumferential direction thereof, in which an interval between one pair of cams in the circumferential direction is larger than an interval between another pair of cams in the circumferential direction, a cutout being formed in said moving tube at a part between the one pair of cams having the larger interval; and a driving device disposed on the side of said cutout of said moving tube and including a motor having a rotation shaft parallel with the optical axis direction and a gear mechanism having an output gear arranged to rotate according to a rotation of said rotation shaft, said motor and said output gear being juxtaposed, and end parts of said motor and said output gear on the side of said moving tube being inserted within said cutout of said moving tube at least when said mbving tube comes closest to said motor and said output gear.

2. A lens barrel according to claim 1, further comprising a circuit board on which a plurality of electric parts are mounted, said circuit board and said motor being electrically connected to each other.

3. A lens barrel according to claim 1, wherein said gear mechanism includes a reduction gear arranged to transmit the rotation of the rotation shaft of said motor to said output gear while reducing a speed thereof.

4. A lens barrel according to claim 3, wherein a lens holding tube which holds a focusing lens is helicoid-coupled with said moving tube, said lens holding tube has a gear formed in a circumferential direction thereof, a focus gear is mounted on said lens holding tube to be in mesh with the gear of said lens holding tube and to cause the gear to rotate, said focus gear is arranged to move in the optical axis direction with respect to said output gear of said motor and also to rotate integrally with said output gear, and said cams of said moving tube are arranged to cause another lens holding frame to move in the optical axis direction.

5. A lens barrel according to claim 1, wherein a lens holding tube is mounted on said moving tube in such a way as to be movable in the optical axis direction by rotating, a gear is formed on said lens holding tube, a gear is mounted on said moving tube and arranged to be in mesh with the gear of said lens holding tube to cause said lens holding tube to rotate, and said gear of said moving tube is arranged to move in the optical axis direction with respect to said output gear of said motor and also to rotate integrally with said output gear.

6. A lens barrel comprising:

a moving tube arranged to move in an optical axis direction and having a cutout; and a driving device disposed on the side of said cutout of said moving tube and including a motor having a rotation shaft parallel with the optical axis direction and a gear mechanism having an output gear arranged to rotate according to a rotation of said rotor, said motor and said output gear being juxtaposed, and end parts of said motor and said output gear on the side of said moving tube being inserted within said cutout of said moving tube at least when said moving tube comes closest to said motor and said output gear.

7. A lens barrel according to claim 6, further comprising a circuit board on which a plurality of electric parts are mounted, said circuit board and said motor being electrically connected to each other.

8. A lens barrel according to claim 6, wherein said gear mechanism includes a reduction gear arranged to transmit the rotation of said rotor of said motor to said output gear while reducing a speed thereof.

9. A lens barrel according to claim 8, wherein a lens holding tube which holds a focusing lens is helicoid-coupled with said moving tube, said lens holding tube has a gear formed in a circumferential direction thereof, a focus gear is mounted on said lens holding tube to be in mesh with the gear of said lens holding tube and to cause the gear to rotate, said focus gear is arranged to move in the optical axis direction with respect to said output gear of said motor and also to rotate integrally with said output gear, and said cams of said moving tube are arranged to cause another lens holding frame to move in the optical axis direction.

10. A lens barrel according to claim 6, wherein a lens holding tube is mounted on said moving tube in such a way as to be movable in the optical axis direction by rotating, a gear is formed on said lens holding tube, a gear is mounted on said moving tube and arranged to be in mesh with the gear of said lens holding tube to cause said lens holding tube to rotate, and said gear of said moving tube is arranged to move in the optical axis direction with respect to said output gear of said motor and also to rotate integrally with said output gear.

11. A lens barrel comprising:
a moving tube arranged to move in an optical axis direction and having a cutout; and
a driving device disposed on the side of said cutout of said moving tube and including a bar-shaped vibration motor having a rotor arranged to rotate around a rotation axis parallel with the optical axis direction and a gear mechanism having an output gear arranged to rotate according to a rotation of said rotor, said motor and said output gear being juxtaposed, and end parts of said motor and said output gear on the side of said moving tube being inserted within said cutout of said moving tube at least when said moving tube comes closest to said motor and said output gear.

12. A lens barrel according to claim 11, further comprising a circuit board on which a plurality of electric parts are mounted, said circuit board and said motor being electrically connected to each other.

13. A lens barrel according to claim 11, wherein said gear mechanism includes a reduction gear arranged to transmit the rotation of said rotor of said motor to said output gear while reducing a speed thereof.

14. A lens barrel according to claim 13, wherein a lens holding tube which holds a focusing lens is helicoid-coupled with said moving tube, said lens holding tube has a gear formed in a circumferential direction thereof, a focus gear is mounted on said lens holding tube to be in mesh with the gear of said lens holding tube and to cause the gear to rotate, said focus gear is arranged to move in the optical axis direction with respect to said output gear of said motor and also to rotate integrally with said output gear, and said cams of said moving tube are arranged to cause another lens holding frame to move in the optical axis direction.

15. A lens barrel according to claim 11, wherein a lens holding tube is mounted on said moving tube in such a way as to be movable in the optical axis direction by rotating, a gear is formed on said lens holding tube, a gear is mounted on said moving tube and arranged to be in mesh with the gear of said lens holding tube to cause said lens holding tube to rotate, and said gear of said moving tube is arranged to move in the optical axis direction with respect to said output gear of said motor and also to rotate integrally with said output gear.

16. A lens barrel comprising:
a moving tube arranged to move in an optical axis direction, said moving tube having at least three cams arranged along a circumferential direction thereof, in which an interval between one pair of cams in the circumferential direction is larger than an interval between another pair of cams in the circumferential direction, a cutout being formed in said moving tibe at a part between the one pair of cams having the larger interval; and
a driving device disposed on the side of said cutout of said moving tube and including a bar-shaped vibration motor having a rotor arranged to rotate around a rotation axis parallel with the optical axis direction and a gear mechanism having an output gear arranged to rotate according to a rotation of said rotor, said motor and said output gear being juxtaposed, and end parts of said motor and said output gear on the side of said moving tube being inserted within said cutout of said moving tube at least when said moving tube comes closest to said motor and said output gear.

17. A lens barrel according to claim 16, further comprising a circuit board on which a plurality of electric parts are mounted, said circuit board and said motor being electrically connected to each other.

18. A lens barrel according to claim 16, wherein said gear mechanism includes a reduction gear arranged to transmit the rotation of said rotor of said motor to said output gear while reducing a speed thereof.

19. A lens barrel according to claim 18, wherein a lens holding tube which holds a focusing lens is helicoid-coupled with said moving tube, said lens holding tube has a gear formed in a circumferential direction thereof, a focus gear is mounted on said lens holding tube to be in mesh with the gear of said lens holding tube and to cause the gear to rotate, said focus gear is arranged to move in the optical axis direction with respect to said output gear of said motor and also to rotate integrally with said output gear, and said cams of said moving tube are arranged to cause another lens holding frame to move in the optical axis direction.

20. A lens barrel according to claim 16, wherein a lens holding tube is mounted on said moving tube in such a way as to be movable in the optical axis direction by rotating, a gear is formed on said lens holding tube, a gear is mounted on said moving tube and arranged to be in mesh with the gear of said lens holding tube to cause said lens holding tube to rotate, and said gear of said moving tube is arranged to move in the optical axis direction with respect to said output gear of said motor and also to rotate integrally with said output gear.

21. A lens barrel comprising:

a driving device including a bar-shaped vibration motor having a rotor arranged to rotate around a rotation axis and a gear mechanism having an output gear arranged to rotate according to a rotation of said rotor, said motor and said output gear being juxtaposed; and a circuit board on which a plurality of electric parts are mounted, said circuit board and said vibration motor being electrically connected to each other.

22. A lens barrel according to claim 21, wherein said gear mechanism includes a reduction gear arranged to transmit the rotation of said rotator of said motor to said output gear while reducing a speed thereof.

23. A lens barrel according to claim 21, wherein said circuit board and said vibration motor are electrically connected to each other through a flexible printed circuit board.

24. An optical apparatus comprising:

a lens barrel according to one of claims 1 to 23; and a camera body on which said lens barrel is mounted.

25. A driving device comprising:

a bar-shaped vibration motor having a rotor arranged to rotate around a rotation axis;

a gear mechanism having an output gear arranged to rotate according to a rotation of said rotor, said motor and said output gear being juxtaposed; and a circuit board on which a plurality of electric parts are mounted, said circuit board and said vibration motor being electrically connected to each other.

26. A device device according to claim 25, wherein said circuit board and said vibration motor are electrically connected to each other through a flexible printed circuit board.

* * * * *

UNITED STATES PATENT AND TRADEMARK OFFICE
CERTIFICATE OF CORRECTION

PATENT NO.    : 6,128,141
DATED         : October 3, 2000
INVENTOR(S)   : Tatsuya Sato et al.

It is certified that error appears in the above-identified patent and that said Letters Patent is hereby corrected as shown below:

Column 1,
Line 11, "2. Description of Related Art" should stand alone. New paragraph afterwards.

Column 8,
Line 28, delete "mbving" and insert -- moving --.

Column 10,
Line 20, delete "tibe" and insert -- tube --.

Signed and Sealed this

Eighteenth Day of December, 2001

Attest:

JAMES E. ROGAN
*Director of the United States Patent and Trademark Office*

*Attesting Officer*